Dec. 24, 1963  D. J. SHEPHERD  3,115,179
LINER FOR RADIAL-PLY TIRES
Filed Jan. 29, 1962

INVENTOR.
DAVID J. SHEPHERD
BY
*J. B. Holden*
ATTORNEY

United States Patent Office 3,115,179
Patented Dec. 24, 1963

3,115,179
LINER FOR RADIAL-PLY TIRES
David J. Shepherd, Akron, Ohio, assignor to The Goodyear Tire & Rubber Company, Akron, Ohio, a corporation of Ohio
Filed Jan. 29, 1962, Ser. No. 169,406
3 Claims. (Cl. 152—354)

This invention relates to a tubeless radial-ply tire having short, discrete and discontinuous lengths of filamentary material in the liner which seals the inner surface of the tire against loss of air. The filamentary material stiffens the liner so that it forms a barrier of sufficient strength to prevent the air pressure within the tire from blowing the carcass, etc. out between the cords of the radial ply. This structure has particular value in airplane tires and other tires in which very high air pressures are used.

There is nothing novel about the construction of the one or more radial cord plies. The cords may be of wire (preferably steel coated with brass to provide adherence to the rubber), nylon, rayon, cotton. These cords extend from bead to bead, and lie in radial planes.

The one or more radial plies are covered with a tread of any usual composition and design. The tire ordinarily contains a breaker of some sort, and may include other construction elements ordinarily used in a tire. The rubber of the liner may be of any usual composition. (The word "rubber" is used herein to refer to any usual liner composion whether of natural or synthetic origin.) By incorporating the short filaments in the liner it is stiffened so that when the tire is inflated it does not blow out between the cords in the one or more radial plies.

The filamentary material incorporated in the liner may be wire, e.g. brass-plated steel wire of about .004 to .020 inch gauge, or cotton, nylon or rayon filaments or flock of any type which materially raises the modulus of the liner. Short lengths of brass-plated steel wire are preferred. Short cords cannot be used because they transmit air through the liner. The amount of the filamentary material will vary from about one to five volume percent, based on the weight of the liner.

The filamentary material is mixed with the rubber and then calendered and/or extruded to form a sheet suitable for incorporation as a liner on the inner surface of the tire. By calendering or extruding or a like operation, flexible filamentary materials such as plastic filaments and flock are aligned in the rubber, but stiffer material, such as wire, is not as readily straightened out and aligned in the rubber. If there is substantial alignment of the filamentary material, the liner is preferably applied with the aligned material lying circumferentially of the tire.

The invention is further described in connection with the accompanying drawing, in which—

Figure 1:
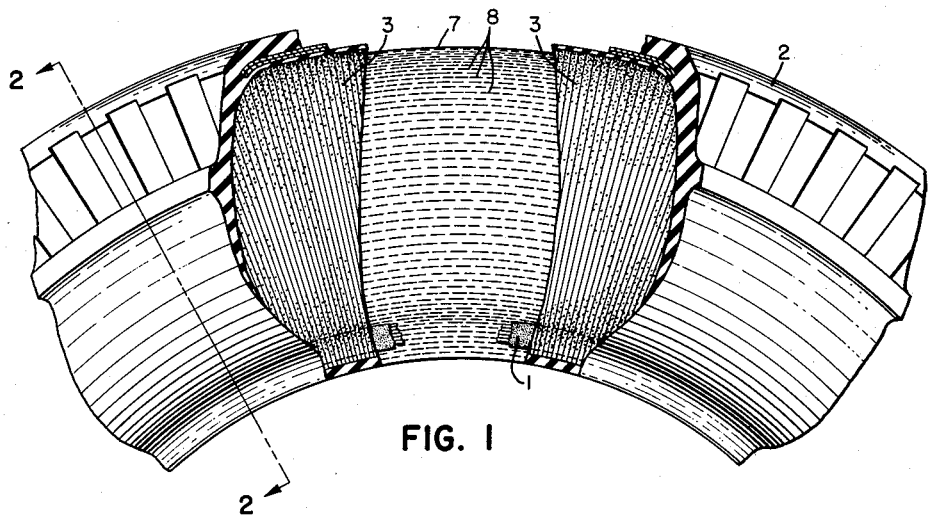
Figure 2:
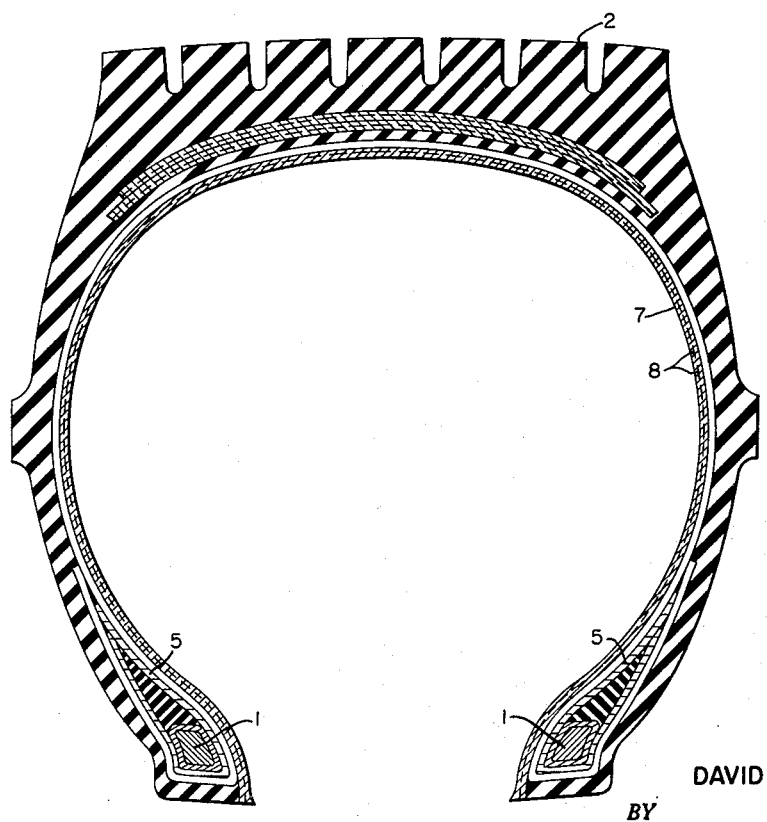

FIG. 1 is a side view of part of a radial-ply tire partly broken away to show its construction; and FIG. 2 is a section through the tire on the line 2—2 of FIGURE 1.

The tire includes the usual beads 1 and tread 2. The radial ply is composed of cords 3 which lie in radial planes. The ends of this ply are anchored to beads 1 protected by flipper strip 5.

Immediately within the radial ply is the liner 7 which contains short, discrete and discontinuous lengths 8 of filamentary material, preferably about ½ inch in length and of such composition that a good bond is formed with the rubber. The liner extends across the crown of the tire and into the sidewall. It is not necessary that filamentary material be included in the portion of the liner under the breaker or in the portion adjacent the beads. Thus, the filamentary material need not be distributed uniformly from one edge of the liner to the other, and the liner may be made up of overlapping sections only some of which include the filamentary material.

The filamentary material 8 stiffens the ply 7 and gives it resistance to bursting—especially in the circumferential direction between the cords.

The invention is covered in the claims which follow.
What I claim is:

1. A tire which comprises two beads, cords all of which are radial, the opposite ends of the cords being anchored to the respective beads, and on the inner surface of the tire and adhering to said surface from one bead to the other an air-impervious liner of rubber containing short, discrete and discontinuous lengths of filamentary material which stiffen the liner so that it resists being blown out between the cords by the air pressure within the tire.

2. The tire of claim 1 in which at least a substantial portion of the filamentary material is aligned circumferentially of the tire.

3. The tire of claim 1 in which the filamentary material is brass-plated steel wire.

References Cited in the file of this patent
UNITED STATES PATENTS

| | | |
|---|---|---|
| 1,117,994 | Freeman | Nov. 24, 1914 |
| 2,698,042 | Perkins | Dec. 28, 1954 |
| 2,958,360 | Macklem et al. | Nov. 1, 1960 |
| 2,960,139 | Engstrom et al. | Nov. 15, 1960 |

FOREIGN PATENTS

| | | |
|---|---|---|
| 769,296 | Great Britain | Mar. 6, 1957 |